(12) United States Patent
Boon et al.

(10) Patent No.: US 8,931,632 B2
(45) Date of Patent: Jan. 13, 2015

(54) JAM REDUCTION

(75) Inventors: Anthony Boon, Kitchener (CA); Frank B. Dunn, Waterloo (CA)

(73) Assignee: NCR Corporation, Duluth, GA (US)

( * ) Notice: Subject to any disclaimer, the term of this patent is extended or adjusted under 35 U.S.C. 154(b) by 160 days.

(21) Appl. No.: 13/551,351

(22) Filed: Jul. 17, 2012

(65) Prior Publication Data

US 2014/0021015 A1   Jan. 23, 2014

(51) Int. Cl.
*B65G 17/00* (2006.01)
*B65G 15/62* (2006.01)
*B65G 15/12* (2006.01)

(52) U.S. Cl.
CPC .............. *B65G 15/12* (2013.01); *B65G 15/62* (2013.01)
USPC .......................................... 198/841; 198/837

(58) Field of Classification Search
CPC ........ B65G 15/10; B65G 15/12; B65G 15/14; B65G 15/62; B65G 15/64
USPC ............................................... 198/817, 837, 841
See application file for complete search history.

(56) References Cited

U.S. PATENT DOCUMENTS

| | | | | |
|---|---|---|---|---|
| 3,650,377 A * | 3/1972 | Rash | ............................. | 198/817 |
| 4,545,477 A * | 10/1985 | Besch | ........................... | 198/841 |
| 4,556,143 A * | 12/1985 | Johnson | ........................ | 198/841 |
| 4,802,571 A * | 2/1989 | Born et al. | ..................... | 198/817 |
| 4,889,070 A * | 12/1989 | Sari | .................................. | 118/64 |
| 6,142,293 A * | 11/2000 | Ozawa et al. | ................. | 198/837 |
| 8,061,511 B2 * | 11/2011 | Eberle et al. | .................. | 198/837 |

\* cited by examiner

*Primary Examiner* — James R Bidwell
(74) *Attorney, Agent, or Firm* — Paul W. Martin

(57) ABSTRACT

A method and apparatus are disclosed for transporting at least one item of media. The apparatus includes at least one guide member providing a first guide surface that guides at least one item of media as the item is transported, at least one elongate slit in the guide surface and at least one belt member each extending along a respective slit and comprising a first belt portion that extends outwardly from the slit beyond the guide surface and a further belt portion that undercuts a region of the guide surface.

15 Claims, 5 Drawing Sheets

JAM REDUCTION

FIELD OF THE INVENTION

The present invention relates to a method and apparatus for transporting at least one item of media from one location to another. In particular, but not exclusively, the present invention relates to apparatus which can transport a check or currency note in a Self-Service Terminal whereby the risk of jamming or item tearing is much reduced relative to conventional techniques.

Various Self-Service Terminals (SSTs) are known in which items of media are repeatedly deposited in the terminal and/or dispensed from the terminal. For example, Automated Teller Machines (ATMs) utilize modules which enable currency notes to be removed when desired from an internal storage region and optionally, when deposited by a user at a terminal, currency notes may be placed into a storage region for subsequent use. Typically, checks or other currency notes are presented at an in-feed location of such terminals and from there a transport system is utilized to move the items of media and locate them at a desired location. It is known that as items of media, such as currency notes or checks are transported they can on occasion wrap around a drive roller and jam. Often the jam is not recoverable and sometimes the item being transported can be torn. This is particularly prevalent when items of media move along a transport system and become slightly skewed. As a result of the skew, a lead edge corner of a transported item can slip under a flat belt which is typically used as part of the transport system. When this occurs the document continues along a transport pathway until the corner collides and wraps itself between the belt and a drive roller.

As a result of jamming a terminal will be marked as out of action which can lead to inefficient downtime and a reduced degree of customer satisfaction.

SUMMARY OF THE INVENTION

It is an aim of the present invention to at least partly mitigate the above-mentioned problems.

It is an aim of certain embodiments of the present invention to prevent an item of media such as a currency note or check or other sheet-like item from encountering a position/interface where a drive roller and transport belt meet.

It is an aim of certain embodiments of the present invention to provide a labyrinthine pathway leading from a region where a corner or edge of an item of media is supported to an interface region where a belt transporting the item of media is driven by a drive roller.

It is an aim of certain embodiments of the present invention to prevent a document being transported from slipping under an edge of a transport belt.

It is an aim of certain embodiments of the present invention to prevent non-recoverable document jams and/or prevent document tearing in a Self-Service Terminal (SST) such as an Automated Teller Machine (ATM) or Teller Cash Recycler (TCR) or Scalable Deposit Module (SDM).

According to a first aspect of the present invention there is provided apparatus for transporting at least one item of media, comprising:
- at least one guide member providing a first guide surface that guides at least one item of media as the item is transported;
- at least one elongate slit in the guide surface; and
- at least one belt member each extending along a respective slit and comprising a first belt portion that extends outwardly from the slit beyond the guide surface and a further belt portion that undercuts a region of the guide surface.

Aptly, the at least one guide member comprises a plurality of substantially planar guide plates located in a side-by-side, spaced apart relationship; wherein
- a space between opposed edges of adjacent guide regions provides a respective elongate slit in the guide surface provided by respective upper surfaces of the adjacent guide regions.

Aptly, each guide region has a straight edge that extends between an upper surface comprising the first guide surface and a lower surface of the guide member.

Aptly, each guide region has an edge that comprises an undercut region.

Aptly, the further belt portion undercuts the guide surface on just one side of the belt member.

Aptly, the further belt portion undercuts the guide surface on a first and second side of the belt member.

Aptly, a cross-section of each belt comprises a substantially flat belt region having a central body region and edge regions, comprising said further belt portion, extending opposite from each other and away from the body region; and
- at least one upstanding region extending substantially perpendicular to and away from the central body region within a respective slit, a tip region of said upstanding region comprising said first belt portion.

Aptly, the upstanding region and associated tip of each belt is substantially square or hemispherical or trapezoidal or pin shaped in shape.

Aptly, each belt is an endless belt and the apparatus further comprises a plurality of roller elements associated with each belt member wherein at least one of the roller elements is a driven roller element that selectively drives the belt along the slit.

Aptly, the apparatus further includes a further guide surface comprising a further guide surface locatable in an opposed substantially parallel spaced apart relationship with respect to the first guide surface and comprising one or more belt members that each locates in an opposed co-operating relationship to a respective one of said at least one belt members.

According to a second aspect of the present invention there is provided an Automated Teller Machine (ATM) or Scalable Deposit Module (SDM) comprising apparatus for transporting at least one item of media comprising:
- at least one guide member providing a first guide surface that guides at least one item of media as the item is transported;
- at least one elongate slit in the guide surface; and
- at least one belt member each extending along a respective slit and comprising a first belt portion that extends outwardly from the slit beyond the guide surface and a further belt portion that undercuts a region of the guide surface and wherein each item of media is a currency note or check.

According to a third aspect of the present invention there is provided a method of transporting at least one item of media, comprising:
- guiding at least one item of media on a guide surface comprising at least one elongate slit as said item is transported; and
- locating said item of media along a transport pathway aligned with the slit via at least one belt member that extends outwardly from the slit beyond the guide surface and includes a further belt portion that undercuts a region of the guide surface.

Aptly, the method further comprises providing a labyrinthine path between the guide surface and an interface region between the belt member and a roller element that drives the belt member.

Aptly, the method further comprises transporting the item of media via at least one endless belt that includes a belt portion that extends under the guide surface on first and second sides of the slit in the guide surface in which the belt member is located.

According to a fourth aspect of the present invention there is provided a method of transporting one or more items of media, comprising the steps of:

as at least one item of media is transported along a transport pathway, preventing an item from encountering an interface region between a belt member that locates the item and a roller member that drives the belt member.

Certain embodiments of the present invention provide the advantage that items of media are guided by a guide surface. At least one drive belt that is used to transport an item of media is maintained behind the guide surface with a portion of the belt extending beyond the guide surface to drive the belt. By having a portion of the belt extend proud of the guide surface and also undercutting a region of the guide surface, items of media find it impossible to work their way under the belt to an area which would otherwise cause a jam.

Certain embodiments of the present invention provide the advantage that items of media such as checks or currency notes are transported along a transport pathway but are prevented from encountering an interface region between a belt member that locates the item and a roller member that drives the belt member. This helps prevent jamming and tearing of transported documents.

Certain embodiments of the present invention utilize a generally T-shaped endless belt to transport items of media along a transport pathway. Because of the cross-section of the belt the corner or edge of any transported documents will merely run into a side of the belt and therefore cannot move down to a point where the edge of the belt meets a drive roller.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
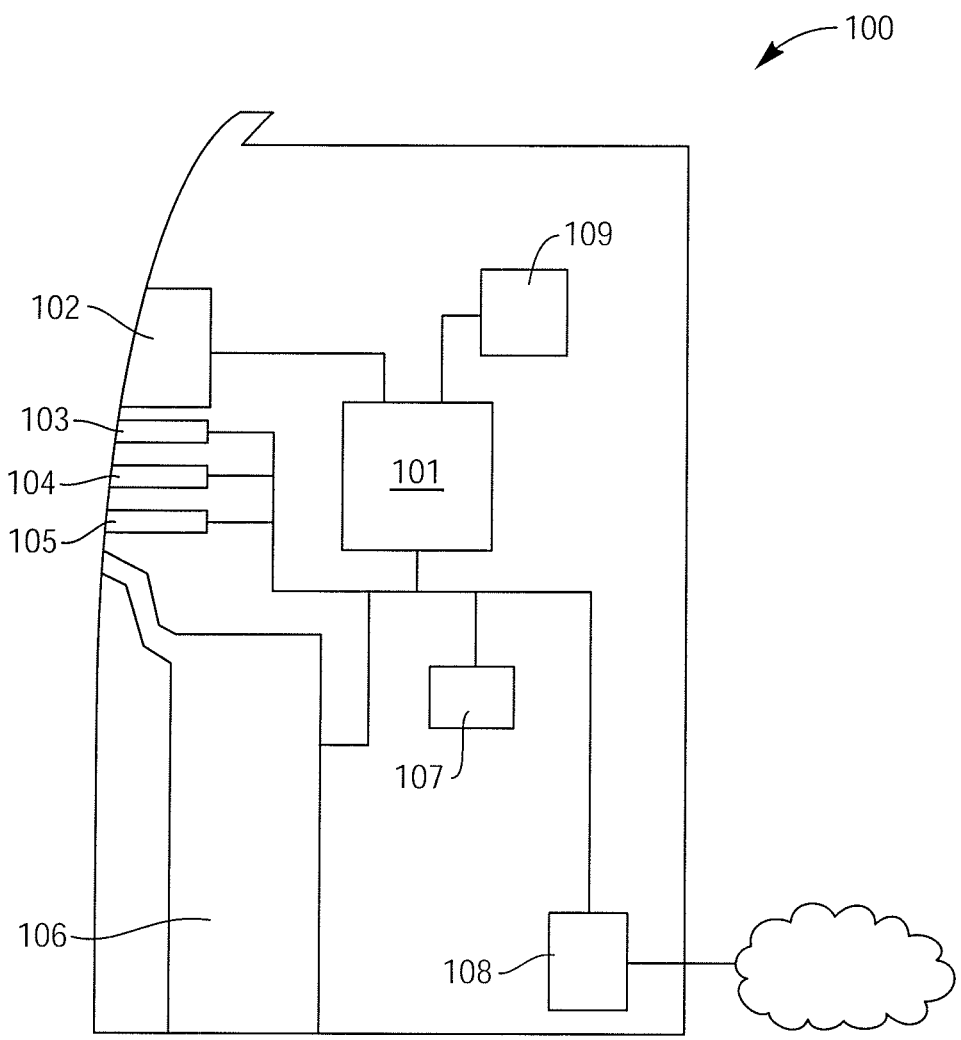
FIG. 1 illustrates a schematic diagram of a Self-Service Terminal (SST) in the form of an Automated Teller Machine (ATM)

In the drawings like reference numerals refer to like parts.

FIG. 1 illustrates a block diagram of a Self-Service Terminal (SST) 100 in the form of an Automated Teller Machine (ATM) according to one embodiment of the present invention. It will be understood that certain embodiments of the present invention are applicable to other types of terminal such as ATMs, vending machines, Teller Cash Recyclers (TCRs), change machines and the like or more generally when a sheet like item of media is to be moved from one location to another. Likewise, items of media such as, but not limited to, currency notes, checks, tickets, giros and the like may be deposited at and/or dispensed from such terminals.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser/deposit module 106, a journal printer module 107 for creating a record of every transaction executed by the ATM, a connection module 108, an operator panel module 109 for use by a service operator (such as a field engineer, a replenisher (of currency, of printer paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers.

Figure 2:
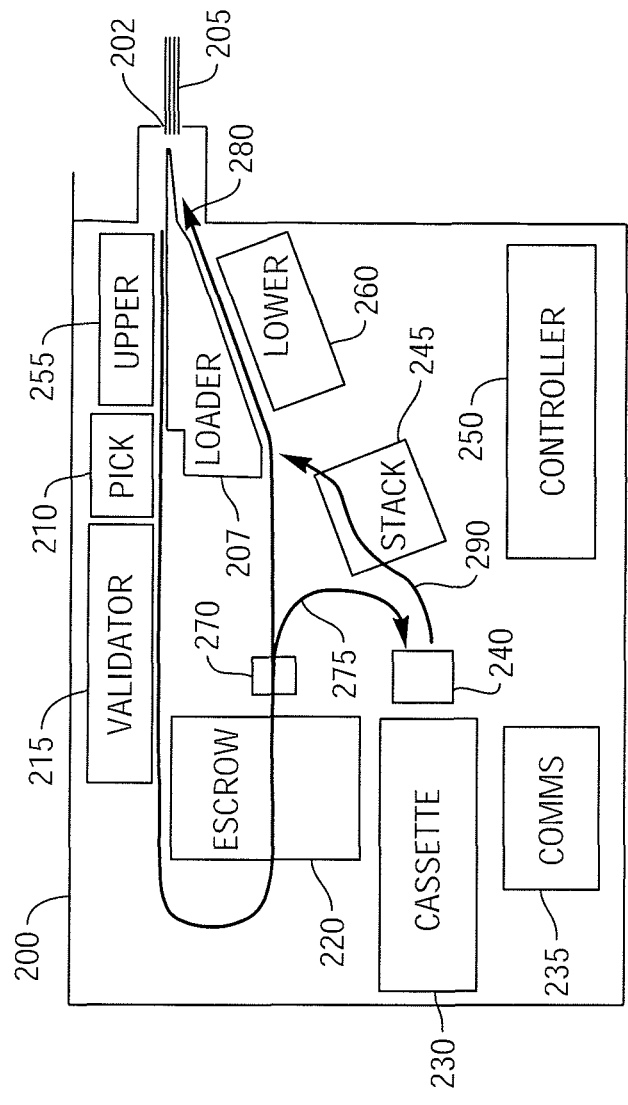
FIG. 2 illustrates a schematic diagram of a media dispenser/depository.

Reference will now be made to FIG. 2, which is a simplified schematic diagram of a media dispenser/deposit module 106 in the exemplary form of a bunch sheet recycler according to one embodiment of the present invention. The recycler 106 is operable to receive bunches of currency notes (or an individual currency note) from a customer and to dispense bunches of currency notes (or an individual currency note) to a customer. Such a module is an example of a situation in which a transport system must be implemented to locate items of media from one position to another.

The recycler 106 includes a chassis 200 onto which various parts are mounted. The recycler 106 further comprises: a bunch slot 202 into which a bunch of currency notes 205 can be deposited and from which a bunch of currency notes can be dispensed.

The recycler 106 also comprises: a bunch loader 207; a picker 210 aligned with the bunch loader 207 for removing individual currency notes from the bunch (or stack) of currency notes 205; a currency note validator 215; an escrow 220 for temporarily holding validated currency notes until a customer confirms that he/she wants to complete the transaction; a currency cassette 230; a communications circuit board 235 for communicating with a self-service terminal (not shown) into which the recycler 106 may be installed; a pick/deposit unit 240; a currency note stacker 245 for collating currency notes picked from the currency cassette 230 by the pick/deposit unit 240; and an onboard controller 250 for controlling the operation of the recycler 106.

The recycler 106 includes a plurality of currency note transport sections, only some of which will be described herein. An upper currency note transport section 255 is located above the bunch loader 207 and adjacent the picker 210. A lower sheet transport section 260 is located beneath the bunch loader 207 and near the bunch slot 202.

One purpose of the bunch loader 207 is to co-operate with the upper currency note transport section 255 to transport deposited currency notes from the bunch slot 202 to the picker 210. Another purpose of the bunch loader 207 is to co-operate with the lower sheet transport section 260 to transport a bunch of currency notes from either the escrow 220 or the currency note stacker 245 to the bunch slot 202 for delivery to a customer.

There are two different routes that can be taken by a currency note that is inserted into the recycler 106. These routes are determined by the position of a diverter 270 located at an exit of the escrow 220.

The first route is shown by a first arrow 275 and involves the currency note being picked from the bunch of currency notes 205, transported to the picker 210, moved past the validator 215 to be identified and validated, placed in the escrow 220, and from the escrow 220 transported into the cassette 230 via the pick/deposit unit 240.

The second route is shown by a second arrow 280 and involves the currency note being picked from the bunch of currency notes 205, transported to the picker 210, moved past the validator 215 to be identified and validated, placed in the escrow 220, and from the escrow 220 returned to the customer via the lower sheet transporter 260.

Whether a currency note is stored (that is, follows the first route 275 in this embodiment) or returned to the customer (that is, the second route 280 in this embodiment) depends on a number of factors, such as: whether the currency note is recognized, whether the currency note is validated, whether the customer cancels or confirms the transaction, and the like.

When one or more currency notes are to be dispensed from the cassette 230, each currency note is transported along a pre-determined path 290. This is implemented by the controller 250 causing the pick/deposit unit 240 to pick the required number of currency notes. The picked currency notes are then collated by the currency note stacker 245, and then delivered as a bunch to the bunch loader 207 for presenting to a customer.

Figure 3:
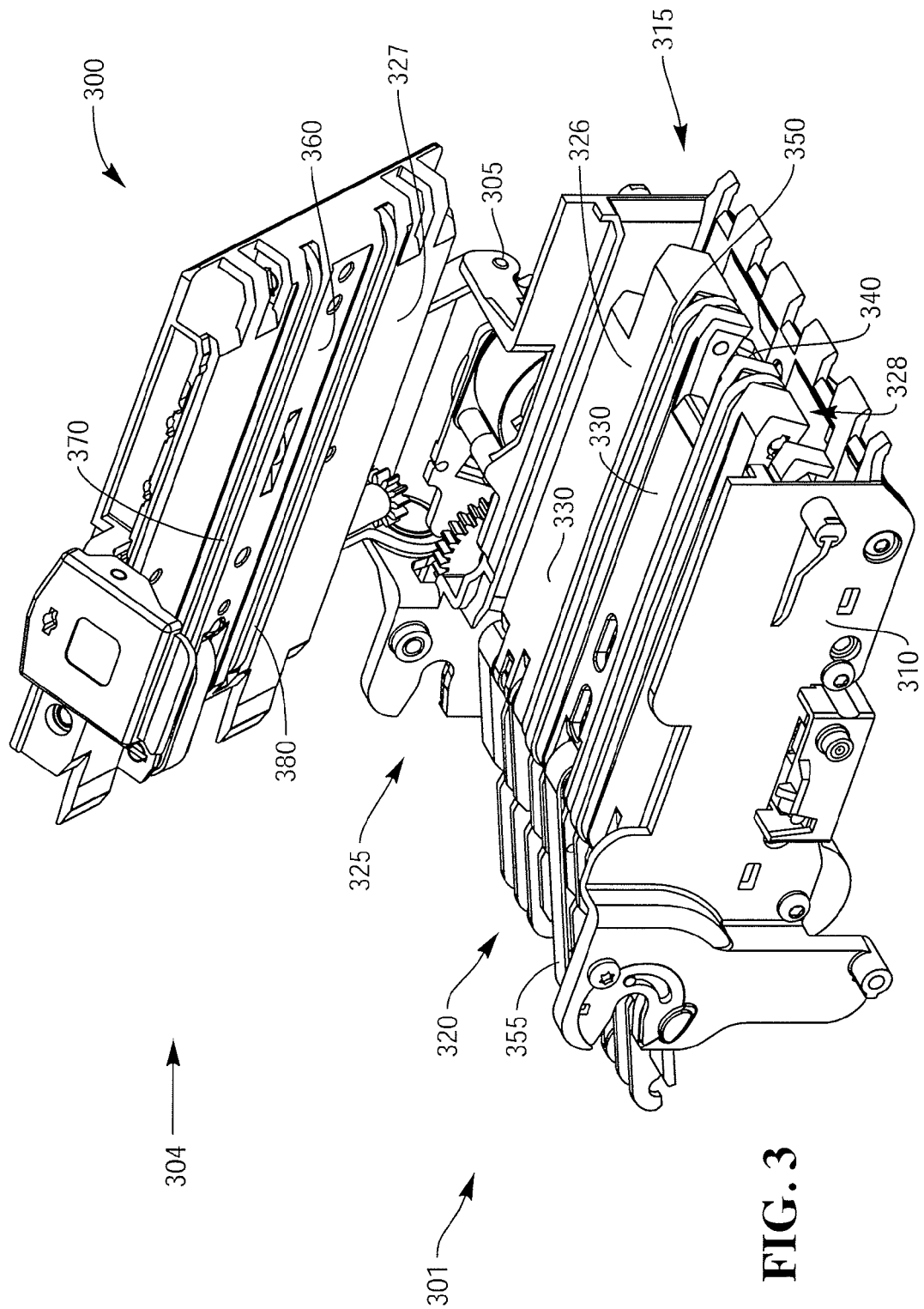
FIG. 3 illustrates an upper and lower transport section which can transport items of media in accordance with an embodiment of the present invention.

FIG. 3 illustrates a transport module 300, according to an embodiment of the present invention. The transport module may, for example, be utilized in a Scalable Deposit Module (SDM) in-feed or tiltinator module. It will be appreciated that certain embodiments of the present invention are broadly applicable wherever a sheet like item of media is to be moved from one location to another. The transport module 300 includes a lower drive unit 301 and upper drive unit 304. The upper drive unit 304 is pivotably connected via a pivoting connection 305 to the lower drive unit 301. The transport module 300 shown in FIG. 3 is in an "open" configuration for the purposes of explanation and in a format in which servicing can be carried out. In use, the upper unit 304 is pivoted into a "closed" position as shown later in more detail.

The lower drive unit includes a chassis 310 having a first input end region 315 and a further output end 320. Items of media such as checks and/or currency notes are input as single items or optionally as a neat stack (referred to as a bunch) of notes at the input end 315. The incoming items of media pass into a transport region 325. The transport region 325 is a region between an upper guide surface 326 of the lower drive unit 301 and a lower guide surface 327 of the upper drive unit 304. The chassis 310 supports an item guide 328 which is a rigid plastic body that includes multiple planar regions 330 in a side-by-side configuration. The multiple planar regions together provide the upper guide surface 326 which helps locate items of media as they are transported from the input to the output of the transport module. The item guide 328 is a single moulded plastic structure (multiple separate pieces could of course be utilized, as could other materials such as metal or the like) but the upper surface is split longitudinally to divide the side-by-side planar regions 330. The separations each provide a respective elongate slit 340 along which a respective endless belt 350 is rotatably mounted. A drive roller (not shown in FIG. 3) is rotatably mounted at an end of each slit. Aptly, at least one of the drive rollers is a driven roller. Items of media are transported away from the transport region 325 by a further endless belt 355.

The upper drive unit 304 likewise includes a guide surface 327. In the embodiment illustrated in FIG. 3 this is provided by a single unitary housing 360 which includes two elongate slits 370. The number of elongate slits 370 in the upper unit 304 matches the number of elongate slits in the lower unit. An endless drive belt 380 is mounted in each slit 370 in the upper drive unit. An end of each endless belt in the upper drive unit 304 passes around a roller (not shown in FIG. 3). At least one of the upper rollers at the end of each endless belt 380 in the upper unit 304 is a driven roller.

Figure 4:
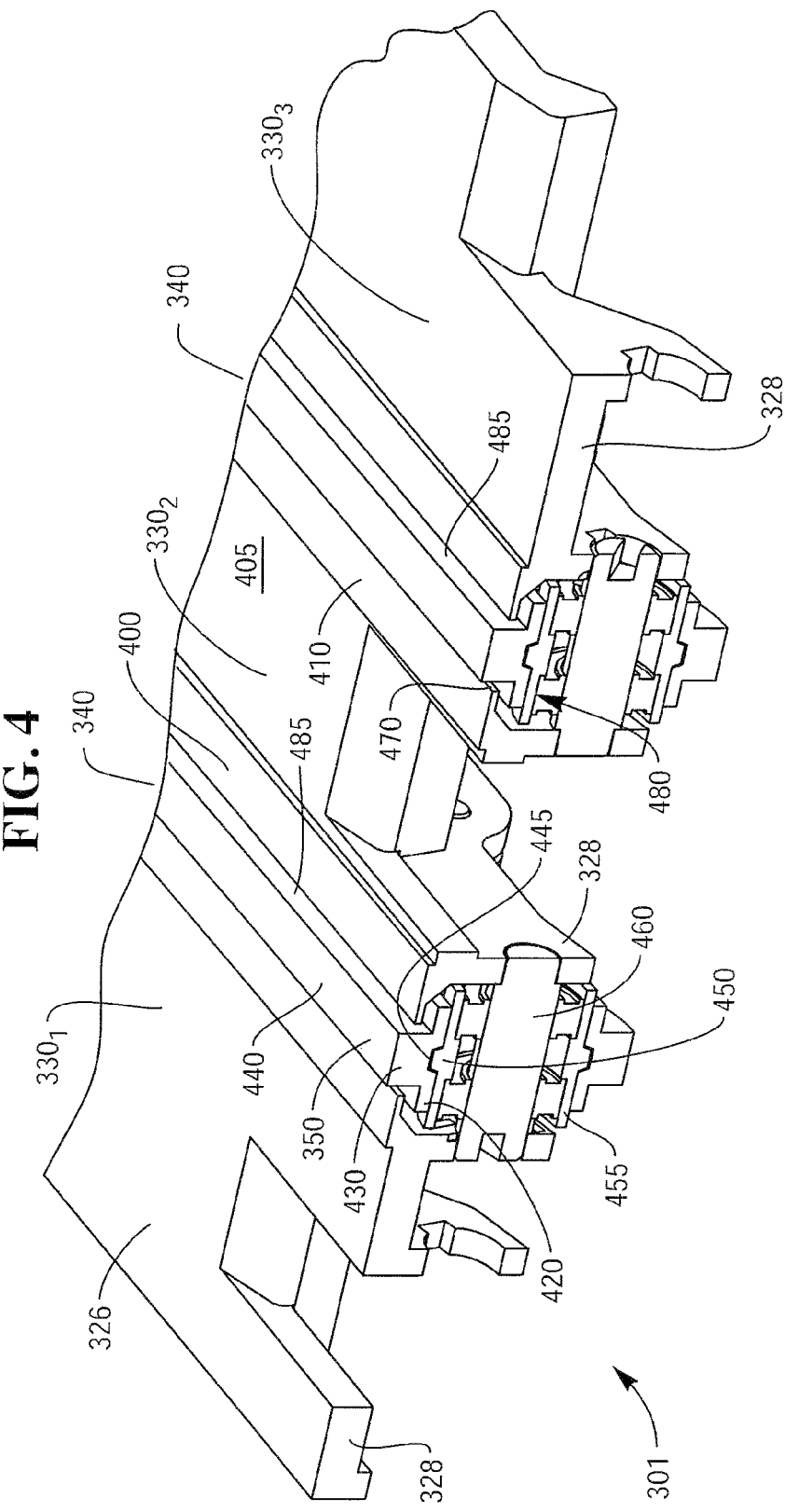
FIG. 4 illustrates a lower part of a transport section and shows a cross-section of a transport belt in more detail.

FIG. 4 helps illustrate a cross-section of the lower drive unit 301 shown in FIG. 3 in more detail. More particularly, FIG. 4 illustrates a cross-section taken through the input end of the item guide 328 where the end rollers, about which the belts extend, are located. As illustrated in FIG. 4, an upper guide surface 326 of the lower drive unit 301 is provided by a first planar region $330_1$, an adjacent central planar surface $330_2$ and an adjacent third planar region $330_3$. Whilst described as planar, that is to say flat, regions, each region 330 is illustrated as having a slightly complex profile. For example, the central planar region $330_2$ has a flat edge surface 400 immediately next to a belt which dips downwardly into a central slightly dished region 405 and then extends upwardly to an adjacent flat region 410 which is immediately next to a further belt. It will be appreciated that the planar regions which provide the upper guide surface should be sufficiently smooth and flat so that items of media being carried along on the belts are guided and not hindered as they are transported.

As illustrated in FIG. 4, the endless belt 350 has a generally T-shaped cross-section. More particularly, each belt 350 has a substantially flat belt profile region 420 which extends away from a central region 430 of the belt. The central region 430 of the belt extends upwardly proud of the guide surface 326 and has an outwardly extending contact surface 440. The contact surface 440 comes into contact with an item of media being transported in the transport module. A back surface of the generally flat region 420 of the belt has an indented central groove 445. This receives a central rib 450 of a roller 455 which is shown in cross-section in FIG. 4. The roller 455 rotates about a respective axle 460 which is duly rotatably mounted in the item guide. It will be understood that while a cross-section is illustrated in FIG. 4, the endless belt is wrapped around the outer circumferential surface of the roller at the end of the item guide. The rib 450 and groove 445 help locate the belt as it is driven around the roller.

FIG. 4 also helps illustrate how a portion of a drive belt undercuts a section on either side of the slit. As illustrated in FIG. 4, a slit 340 is formed by spaced apart edges of adjacent planar regions 330 of the item guide. The plastic body which thus forms the item guide is thus cut away from the upper surface. Each planar guide region has a straight edge 470 that extends between the upper surface 326 which provides the first guide surface and a lower surface of the guide member. The flat belt portion 420 of each belt undercuts the guide surface on both sides of the slit. It will be understood that if the drive belt had a different cross-sectional profile, such as a substantially L-shaped cross-section, then the belt would have a belt portion that undercut the guide surface on just one side of the belt. By having a portion of the belt undercutting the guide surface on one or both sides of the belt, a labyrinthine path is provided between a region where items of media are transported and the interface region 480 between the belt and roller. As such, it is impossible, or virtually impossible, for an edge of an item of media or corner of an item of media to find its way from the upper drive support surface 326 between sides 485 of the belt and the edges 470 of the slits to reach an underside of the belt where the belt meets the roller.

An upper contact surface 440 of the endless belt shown in FIG. 4 has a substantially flat "top hat" profile. Aptly, the upstanding contact surface of an endless belt can optionally have a tip which has a square or hemispherical or trapezoidal or pin-shaped cross-section.

Figure 5:
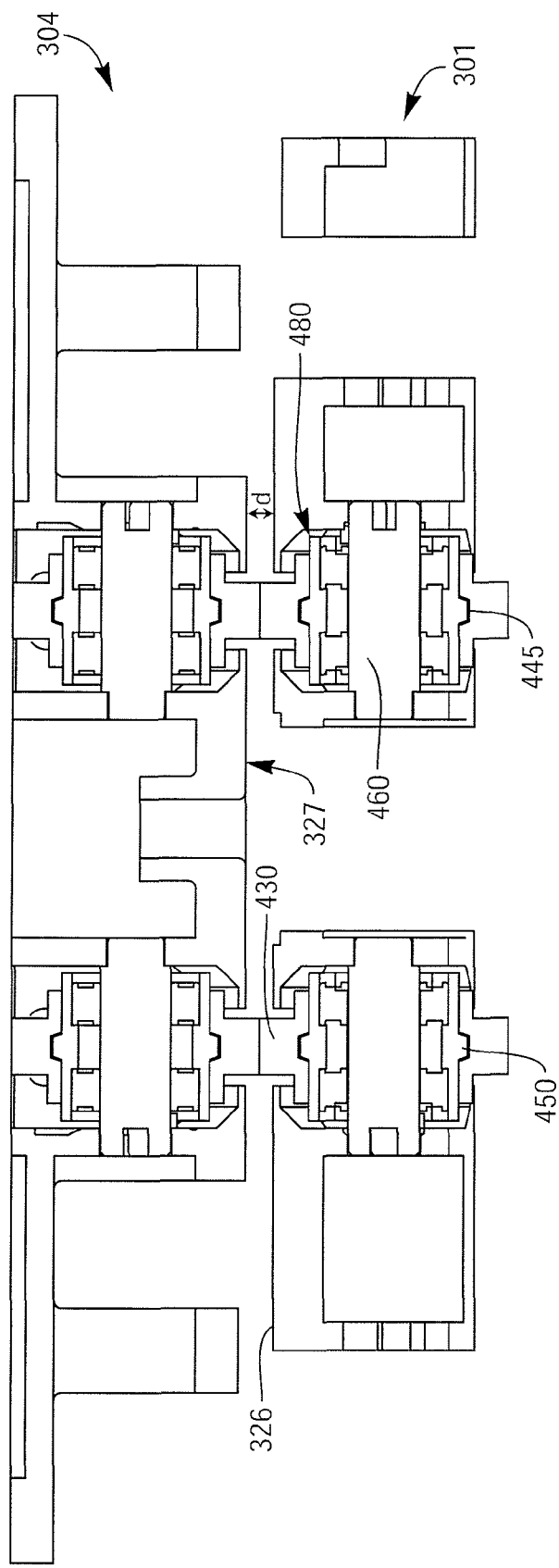
FIG. 5 illustrates a juxtaposed upper and lower transport section.

FIG. 5 illustrates the upper unit 304 pivoted into the "closed" position which is utilized to transport items of media. In the "closed" position, the tips of the endless belts in the lower drive unit are urged resiliently against the tips of the endless belts in the upper drive unit 304. Items of media are thus sandwiched between the tips and as the drive rollers are rotated and the endless belts move, items of media are dragged along by co-operating regions of the belts, thereby transporting the items of media. A distance d between a lower surface 327 of the upper drive unit and an upper surface 326 of the lower drive unit may be set according to a size of a bunch which is to be accepted by the transport module. The size may be adjusted to accommodate for bunch sizes from one to five hundred notes in thickness.

Certain embodiments of the present invention thus prevent an item of media which is being transported from encountering a position where a roller and belt meet. The corner or edge of an item being transported which may become skewed runs into the side of a shaped belt and therefore cannot move down to the point where the edge of the belt meets the roller. Folded or short items may be optionally detected with sensors to further assist in avoiding jamming or tearing of documents. Aptly, two adjacent belts on an upper and lower part of a transport module are utilized in a side by side configuration. This helps ensure that there are always two contact points on most individual items of media which are transported or on a bunch of items being transported. This helps prevent further risk of skewing.

Aptly, transport modules according to certain embodiments of the present invention are used in an in-feed and/or tiltinator region at the front of an ATM and can accept a bundle of up to one hundred cash and/or check items. These are transported as a bunch from an opening in the ATM to separation rollers in a feeder unit. Once a bunch has reached the separation rollers, items of media are fed individually from the stack to a de-skew area for alignment and further processing. It will be appreciated that the in-feed and tiltinator units will also return media back to a customer through the security opening if a transaction is cancelled.

Aptly, the tiltinator has the ability to accept a bunch of media from a re-bunch module through the in-feed from a main transport. Items of media are typically not skewed at this location and thus the risk of jamming at the roller/belt interface is reduced.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for transporting at least one item of media, comprising:
    at least one guide member providing a first guide surface underlying and guiding at least one item of media as the item is transported;
    at least one elongate slit in the guide surface; and
    at least one belt member each extending along a respective slit and comprising a first belt portion that extends outwardly from the slit beyond the guide surface and a further belt portion that undercuts a region of the guide surface.

2. The apparatus as claimed in claim 1, further comprising:
    the at least one guide member comprises a plurality of substantially planar guide regions located in a side-by-side, spaced apart relationship;
    wherein a space between opposed edges of adjacent guide regions provides a respective elongate slit in the guide surface provided by respective upper surfaces of the adjacent guide regions.

3. The apparatus as claimed in claim 2, further comprising:
    each guide region has a straight edge that extends between an upper surface comprising the first guide surface and a lower surface of the guide member.

4. The apparatus as claimed in claim 2, further comprising:
    each guide region has an edge that comprises an undercut region.

5. The apparatus as claimed in claim 1, further comprising:
    the further belt portion undercuts the guide surface on just one side of the belt member.

6. The apparatus as claimed in claim 1, further comprising:
    the further belt portion undercuts the guide surface on a first and second side of the belt member.

7. The apparatus as claimed in claim 1 wherein a cross-section of each belt member comprises:
    a substantially flat belt region having a central body region and edge regions, comprising said further belt portion, extending opposite from each other and away from the body region; and
    at least one upstanding region extending substantially perpendicular to and away from the central body region within a respective slit, a tip region of said upstanding region comprising said first belt portion.

8. The apparatus as claimed in claim 7, further comprising:
    the upstanding region and associated tip of each belt is substantially square or hemispherical or trapezoidal or pin shaped in shape.

9. The apparatus as claimed in claim 1, wherein each belt is an endless belt, the apparatus further comprising:
a plurality of roller elements associated with each belt member wherein at least one of the roller elements is a driven roller element that selectively drives the belt along the slit.

10. The apparatus as claimed in claim 1, further comprising:
a further guide member comprising a further guide surface locatable in an opposed substantially parallel spaced apart relationship with respect to the first guide surface and comprising one or more belt members that each locates in an opposed co-operating relationship to a respective one of said at least one belt members.

11. An Automated Teller Machine (ATM) or Scalable Deposit Module (SDM) comprising the apparatus as claimed in claim 1 wherein each item of media is a currency note or check.

12. A method of transporting at least one item of media, comprising:
guiding at least one item of media on a guide surface comprising at least one elongate slit as said item is transported; and
locating said item of media along a transport pathway aligned with the slit via at least one belt member that extends outwardly from the slit beyond the guide surface and includes a further belt portion that undercuts a region of the guide surface.

13. The method as claimed in claim 12, further comprising:
providing a labyrinthine path between the guide surface and an interface region between the belt member and a roller element that drives the belt member.

14. The method as claimed in claim 12, further comprising:
transporting the item of media via at least one endless belt that includes a belt portion that extends under the guide surface on first and second sides of the slit in the guide surface in which the belt member is located.

15. Apparatus for transporting at least one item of media, comprising:
at least one guide member providing a first guide surface that guides at least one item of media as the item is transported;
at least one elongate slit in the guide surface; and
at least one belt member each extending along a respective slit and comprising a first belt portion that extends outwardly from the slit beyond the guide surface and a further belt portion that undercuts a region of the guide surface;
wherein a cross-section of each belt member comprises:
a substantially flat belt region having a central body region and edge regions, comprising said further belt portion, extending opposite from each other and away from the body region; and
at least one upstanding region extending substantially perpendicular to and away from the central body region within a respective slit, a tip region of said upstanding region comprising said first belt portion.

* * * * *